United States Patent [19]

Baker

[11] 4,440,308
[45] Apr. 3, 1984

[54] FUEL CAP VALVE STRUCTURE

[75] Inventor: Steven F. Baker, Bellevue, Ohio

[73] Assignee: General Motors Corporation, Detroit, Mich.

[21] Appl. No.: 451,277

[22] Filed: Dec. 20, 1982

[51] Int. Cl.³ .......................................... B65D 51/16
[52] U.S. Cl. .................................... 220/204; 220/209; 220/367; 220/DIG. 33
[58] Field of Search ............... 220/204, 202, 203, 209, 220/367, DIG. 33

[56] References Cited

U.S. PATENT DOCUMENTS

| | | | |
|---|---|---|---|
| 3,080,995 | 3/1963 | Palm | 220/203 X |
| 3,820,561 | 6/1974 | Papst et al. | 137/512.2 |
| 3,883,030 | 5/1975 | Mathews et al. | 220/204 |
| 4,094,437 | 6/1978 | Hayashida | 220/367 X |
| 4,337,873 | 7/1982 | Johnson | 220/209 X |

Primary Examiner—Steven M. Pollard
Attorney, Agent, or Firm—Donald F. Scherer

[57] ABSTRACT

A fuel cap has a valve structure for controlling both superatmospheric and subatmospheric pressures in a fuel tank. The valve has a plate or flat disc member with two apertures formed therein. A grommet is secured in each aperture. A pair of resilient valve stems are formed integrally with and on opposite sides of the plate. Each valve stem is disposed to have an end thereof operably positioned with respect to the grommet to seal the respective aperture to provide control of the pressure level in the fuel tank. One valve stem will flex to vent superatmospheric pressure and the other valve stem will flex to vent subatmospheric pressure. The plate is secured or otherwise formed integrally with the closure portion of the fuel cap.

3 Claims, 3 Drawing Figures

FUEL CAP VALVE STRUCTURE

This invention relates to valve assemblies and more particularly to valve assemblies for fuel caps.

It is an object of this invention to provide an improved fuel cap valve assembly wherein a pair of resilient valve stems are formed integrally with a valve plate and cooperate with grommets secured in apertures in the valve plate to provide both superatmospheric and subatmospheric pressure control in the fuel tank.

It is another object of this invention to provide an improved valve structure for a fuel cap wherein the valve structure has a flat plate with two through-apertures therein and a pair of valve stems extending integrally from opposite sides of the plate and being operable to close the respective apertures and wherein the valve plate is secured in the closure portion of the fuel cap so that when the cap is installed in a fuel tank, one valve stem and aperture are operable to control superatmospheric pressure while the other valve stem and aperture are operable to control subatmospheric pressure in the fuel tank.

These and other objects and advantages of the present invention will be more apparent from the following description and drawings in which.

Figure 1:
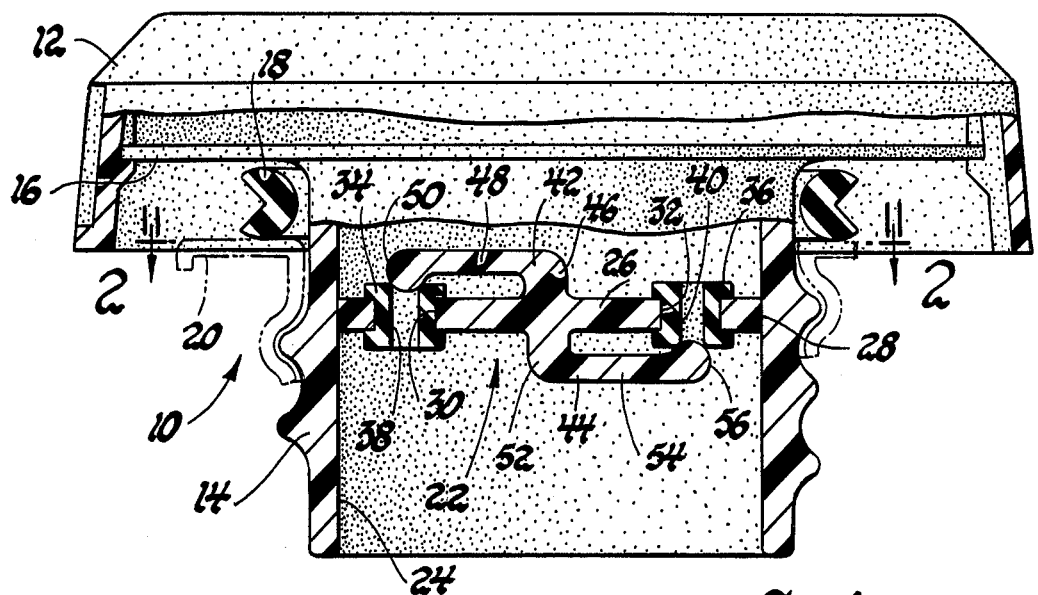
FIG. 1 is an elevational view partly in section of the fuel cap and valve assembly.
Figure 2:
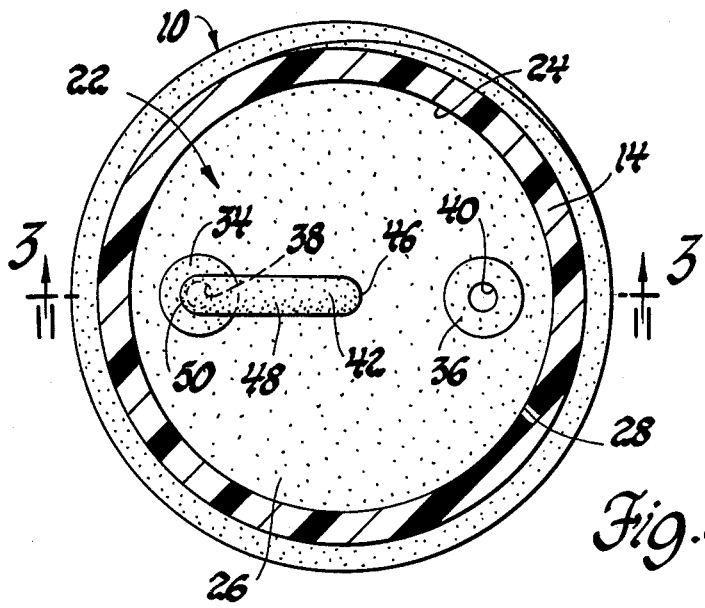
FIG. 2 is a view taken along line 2—2 of FIG. 1.
Figure 3:
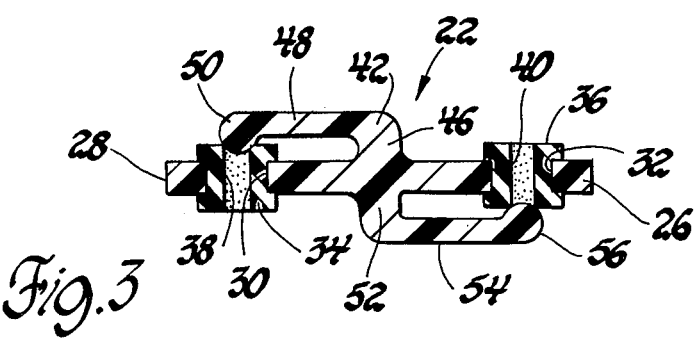
FIG. 3 is a cross-sectional view of the valve assembly taken along line 3—3 of FIG. 2.

Referring to the drawings, wherein like characters represent the same or corresponding parts throughout the several views, there is seen in FIG. 1 a fuel cap, generally designated 10, having a handle portion 12 and a threaded closure portion 14. The threaded closure portion 14 is secured in the handle 12 by a ring 16. The closure 14 is operatively connected to the handle 12 through a conventional torque limited drive mechanism, not shown. Such torque limiting mechanisms are well-known to those skilled in the art.

A seal ring 18 surrounds a portion of the threaded closure 14 and is adapted to seal against the upper lip of a fuel tank such as that shown in phantom line at 20.

A valve structure or assembly, generally designated 22, is bonded to or otherwise formed integrally with the inner surface 24 of the closure portion 14. The valve structure 22 includes a flat cylindrical plate 26 having the outer circumference 28 thereof securedly bonded to the surface 24 to prevent the leakage of vapor or liquid. The flat plate 26 has formed therein a pair of apertures 30 and 32 in which are inserted grommet members 34 and 36, respectively. Each grommet member has a through-aperture 38 and 40, respectively. These apertures 38 and 40 in grommets 34 and 36 are disposed to connect the interior of the fuel tank, not shown, with the atmosphere through passages formed in the closure 14 and handle 12 which passages are not shown.

The plate 26 has integrally formed thereon a pair of valve stems 42 and 44. Valve stem 42 has a body portion 46 extending upwardly, as viewed in FIG. 1, from plate 26 and an arm portion 48 extending radially outward from the body portion 46 and terminating in a substantially spherical end 50 which is disposed to close the aperture 38. The arm 48 has sufficient flexibility to permit the spherical end 50 to seat on aperture 38 and to be displaced therefrom by sufficient pressure in the fuel tank. The flexibility of arm 48 and the size of aperture 38 can be sufficiently controlled such that the superatmospheric pressure within the fuel tank can be controlled with considerable accuracy.

The valve stem 44 has a body portion 52 extending downwardly from the plate 26 and an arm portion 54 extending radially outward from body 52 and terminating in a spherical end 56 which is disposed to seat against the aperture 40 formed in grommet 36. The arm 54 has sufficient flexibility to control the aperture 40 such that the aperture 40 will be opened when the subatmospheric pressure reaches a predetermined level. As with arm 48 and aperture 38, the arm 54 and aperture 40 can be designed to provide an accurate subatmospheric or vacuum control for the fuel tank.

Obviously, the arm 54 will not open on the presence of superatmospheric pressure since such pressure presence will cause the spherical end 56 to seat even more firmly with aperture 40. Likewise, the spherical end 50 will not unseat in the presence of subatmospheric pressure since the presence of such pressure will only serve to draw the spherical end 50 further into engagement with the aperture 38.

The grommets 34 and 36 are preferably made from a very pliable or resilient material to accommodate the seating and sealing of spherical ends 50 and 56. In the alternative, the apertures 30 and 32 can be designed such that the ends 50 and 56 will seat directly thereon. However, for simplicity of mold design, it is preferable to use the grommets as the sealing surfaces for the spherical ends 50 and 56. Each of the grommets 34 and 36 has spaced ridge surfaces which contact the upper and lower surfaces of plate 26. These ridge surfaces provide for sealing at the apertures 30 and 32 and also maintain the grommets 34 and 36 in position on the plate 26 during pressure fluctuations in the fuel tank.

The embodiments of the invention in which an exclusive property or privilege is claimed are defined as follows:

1. A valve structure for use in a threaded closure of a fuel cap for providing a superatmospheric pressure relief and a subatmospheric pressure relief, said valve structure comprising; a flat plate member having spaced flat surfaces and a cylindrical outer surface adapted to be secured to the inner surface of the threaded closure; two apertures extending between the flat surfaces on said flat plate member; two grommet members formed of resilient material each disposed in respective ones of said apertures and each grommet having a central opening and spaced ridge surfaces contacting the flat surfaces of the flat plate member; and a pair of stem members with each stem having a body portion integral with and extending normal to respective ones of the flat surfaces and a flexible arm portion extending from said body portion parallel to the respective flat surface and terminating in a valve member which engages and sealingly closes a respective grommet member.

2. A valve structure for use in a threaded closure of a fuel cap for providing a superatmospheric pressure relief and a subatmospheric pressure relief, said valve structure comprising; a flat plate member having spaced flat surfaces and a cylindrical outer surface adapted to be secured to the inner surface of the threaded closure; two apertures extending between the flat surfaces on said flat plate member; two grommet members formed of resilient material each disposed in respective ones of said apertures and each grommet having a central opening and spaced ridge surfaces contacting the flat surfaces of the flat plate member; and a pair of stem members with each stem having a body portion integral with and extending normal to respective ones of the flat surfaces and a flexible arm portion extending from said body portion parallel to the respective flat surface and terminating in a substantially spherical end portion which engages and sealingly closes the central opening in respective ones of the grommet members.

3. A valve structure for use in a threaded closure for a fuel tank for providing a superatmospheric pressure relief and a subatmospheric pressure relief, said valve structure comprising; a flat plate member having spaced flat surfaces and a cylindrical outer surface adapted to be secured to the inner surface of the threaded closure; two apertures extending between the flat surfaces on said flat plate member; and a pair of stem members with each stem having a body portion integral with and extending normal to respective ones of the flat surfaces and a flexible arm portion extending radially outward from said body portion parallel to the respective flat surface and terminating in a substantially spherical member whih engages and sealingly closes respective ones of the apertures in the flat plate member, one of said spherical members being movable from said respective aperture upon a predetermined superatmospheric pressure in the fuel tank and the other spherical member being movable from said respective aperture upon a predetermined subatmosheric pressure in the fuel tank.

* * * * *